United States Patent [19]

Arnold et al.

[11] Patent Number: 5,400,984
[45] Date of Patent: Mar. 28, 1995

[54] THERMAL ANTI-ICING OF AIRCRAFT STRUCTURES

[75] Inventors: Michael J. Arnold; Derek Cole, both of Bangor, Northern Ireland

[73] Assignee: Short Brothers PLC, Belfast, Northern Ireland

[21] Appl. No.: 64,170

[22] PCT Filed: Sep. 17, 1992

[86] PCT No.: PCT/GB92/01710

§ 371 Date: Aug. 16, 1993

§ 102(e) Date: Aug. 16, 1993

[87] PCT Pub. No.: WO93/06005

PCT Pub. Date: Apr. 1, 1993

[30] Foreign Application Priority Data

Sep. 20, 1991 [GB] United Kingdom ............... 9120113

[51] Int. Cl.⁶ ............................................. B64D 15/04
[52] U.S. Cl. ............................... 244/134 B; 60/39.093
[58] Field of Search .......... 244/134 R, 134 B, 134 C, 244/207, 1 R; 138/143, 148; 60/39.093

[56] References Cited

U.S. PATENT DOCUMENTS

| 2,556,736 | 6/1951 | Palmatier | 244/134 B |
| 2,625,010 | 1/1953 | Clark | 244/134 C |
| 4,482,114 | 11/1984 | Gupta et al. | 244/134 B |
| 4,615,499 | 10/1986 | Knowler | 244/134 B |
| 5,011,098 | 4/1991 | McLaver et al. | 60/39.093 |
| 5,257,498 | 11/1993 | Nikkanen et al. | 244/134 B |

FOREIGN PATENT DOCUMENTS

| 0178144 | 4/1986 | European Pat. Off. . | |
| 0205283 | 12/1986 | European Pat. Off. . | |
| 1281270 | 10/1968 | Germany | 224/134 B |
| 97141 | 10/1939 | Sweden | 244/134 B |
| 1357712 | 6/1974 | United Kingdom . | |

Primary Examiner—Galen L. Barefoot
Attorney, Agent, or Firm—Lyon & Lyon

[57] ABSTRACT

An aircraft structural component comprising a forward compartment formed by a forward bulkhead and a skin structure which extends forwardly of the forward bulkhead and which has an outer surface, and a rear compartment formed between the forward bulkhead and a rear bulkhead. A supply duct extends through the rear compartment and into the forward compartment for the delivery thereto of pressurized hot gases for distribution over the inner surface of the skin structure. A protective shroud duct surrounds the supply duct, extends from the rear bulkhead to the forward bulkhead and forms an annular space between the protective shroud duct and the supply duct. The annular space is closed off at its rear end at the rear bulkhead and throughout its length within the rear compartment by the protective shroud duct and is open at its forward end for gaseous communication with the forward compartment. A discharge duct extends from the forward compartment to atmosphere.

18 Claims, 7 Drawing Sheets

THERMAL ANTI-ICING OF AIRCRAFT STRUCTURES

The present invention relates to thermal anti-icing arrangements for aircraft structures and is particularly although not exclusively concerned with a thermal anti-icing arrangement for an aircraft engine nacelle nose cowl.

In EP 0205283, a thermal anti-icing arrangement is disclosed for preventing the accumulation of ice on the leading edge of an aircraft engine nacelle nose cowl. The nose cowl comprises an annular forward compartment bounded by an annular forward bulkhead and a skin structure which extends forwardly of the forward bulkhead to form the leading-edge profile, the outer surface of which requires to be protected from accumulation of ice thereon and an annular rear compartment which is bounded by the forward bulkhead and an annular rear bulkhead and inner and outer circumferentially extending skin structures. A supply duct extends from the rear bulkhead through the rear compartment and through the forward bulkhead into the forward compartment for delivery to an annular spray ring of pressurised hot gases for distribution over the inner surface of the skin structure of the forward compartment to prevent accumulation of ice on the outer surface of the skin structure. A discharge duct for the exhaustion to atmosphere of spent gases from the forward compartment encloses the supply duct, extends from the forward bulkhead to the rear bulkhead and forms an annular space, which is closed off at its rear end at the rear bulkhead and which is open at its forward end to provide gaseous flow communication with the forward compartment. Leakage of hot gases from the supply duct upon rupture are thus prevented by the discharge duct from entering the rear compartment. The discharge duct in the region of the rear bulkhead communicates with an outlet duct to discharge spent gases from the forward compartment which are channelled rearwardly in the annular space between the discharge duct and the supply duct and are discharged through the outlet duct to atmosphere through an opening in the radially outer skin structure of the rear compartment. As a consequence, hot gases from a ruptured supply duct are also discharged to atmosphere through the outlet duct.

While the supply and discharge duct arrangement described in the prior patent has been found to be successful in preventing the leakage of hot gases from a ruptured supply duct from entering the rear compartment, it has been found to be a disadvantage to use the concentric arrangement of ducts where space considerations need to be taken into account and in particular it has been found that with strict space limitations the annular space provided for channelling the spent gases rearwardly from the forward compartment is insufficient to provide optimum flow to and from the forward compartment.

It is an object of the present invention to provide a thermal anti-icing arrangement for an aircraft engine nacelle nose cowl which while maintaining the advantage of preventing the leakage of hot gases into the rear compartment following rupture of the supply duct will at the same time place little or no restriction on the size of the discharge duct.

It is a further object of the present invention to provide a thermal anti-icing arrangement which maintains or partially maintains flow of hot gases for anti-icing purposes in the event of a leakage of hot gases from the supply duct.

According to a first aspect of the present invention there is provided an aircraft structural component comprising a forward compartment formed by a forward bulkhead and a skin structure which extends forwardly of the forward bulkhead and which has an outer surface which requires to be protected from accumulation of ice thereon, a rear compartment between the forward bulkhead and a rear bulkhead, supply duct means extending through the rear compartment and into the forward compartment for the delivery thereto of pressurised hot gases for distribution over the inner surface of the skin structure to prevent accumulation of ice on or to remove ice from the outer surface of the skin structure, protective means which surrounds the supply duct means, extends from the rear bulkhead to the forward bulkhead and forms an annular space between the protective means and the supply duct means, the annular space being closed off at its rear end at the rear bulkhead and throughout its length within the rear compartment by the protective means and being open at its forward end to provide gaseous flow communication with the forward compartment, whereby leakage of hot gases from the supply duct means upon rupture are prevented by the protective means from entering into the rear compartment and pass into the forward compartment, and discharge duct means for discharging gases from the forward compartment.

In a preferred embodiment of the invention hereinafter to be described, the protective means comprise a forward protective shroud portion secured to the forward bulkhead, a rear protective shroud portion secured to the rear bulkhead and a main protective shroud portion which at one end sealingly engages with either the forward or rearward protective shroud portions and at the other end sealingly and slidably engages with the other protective shroud portion.

In the embodiment of the invention hereafter to be described the supply duct means comprises a forward supply duct portion extending forwardly into the forward compartment and rearwardly into the forward protective shroud portion by which it is supported, a rear supply duct portion mounted in the rear bulkhead and a main supply duct portion which at one end sealingly engages with either the forward supply duct portion or the rear supply duct portion and at the other end sealingly and slidably engages with the other supply duct portion.

In the embodiment of the invention hereinafter to be described the main protective shroud portion at its front end sealingly engages with the forward protective shroud portion and at its rear end sealingly and slidably engages the rearward protective shroud portion. Additionally, the main supply duct portion sealingly engages at its forward end with the forward supply duct portion and at its rear end sealingly and slidably engages with the rear supply duct portion.

According to a second aspect of the present invention provided an aircraft engine nacelle nose cowl including a structural component according to the first aspect of the invention, wherein the forward and rear compartments extend circumferentially to form the nose cowl with the skin structure of the forward compartment providing a leading edge profile for the nose cowl, wherein distributor means are provided in the forward compartment for distributing pressurised hot gases to the inner surface of the skin structure of the forward compartment and wherein the distributor means is connected to the supply duct means for delivery thereto of pressurised hot gases supplied by the supply duct means.

In an embodiment of the invention hereinafter to be described the distributor means comprises a concentrically arranged circumferentially extending apertured spray ring for the distribution of pressurised hot gases supplied thereto.

In the embodiment of the invention to be described the rear compartment is formed with inner and outer circumferentially extending skin structures, the discharge means comprises a discharge duct which extends within the rear compartment from an inlet opening in the forward bulkhead to an outlet opening in the skin structure of the rear compartment to discharge from the forward compartment spent gases to atmosphere through the outlet opening.

Preferably, the outlet opening for the discharge duct is provided in the radially outermost skin structure of the rear compartment and the discharge duct extends through the rear compartment in proximity to the supply duct means and the protective means.

One embodiment of the invention will now be described by way of example with reference to the accompanying drawings in which.

Figure 1:
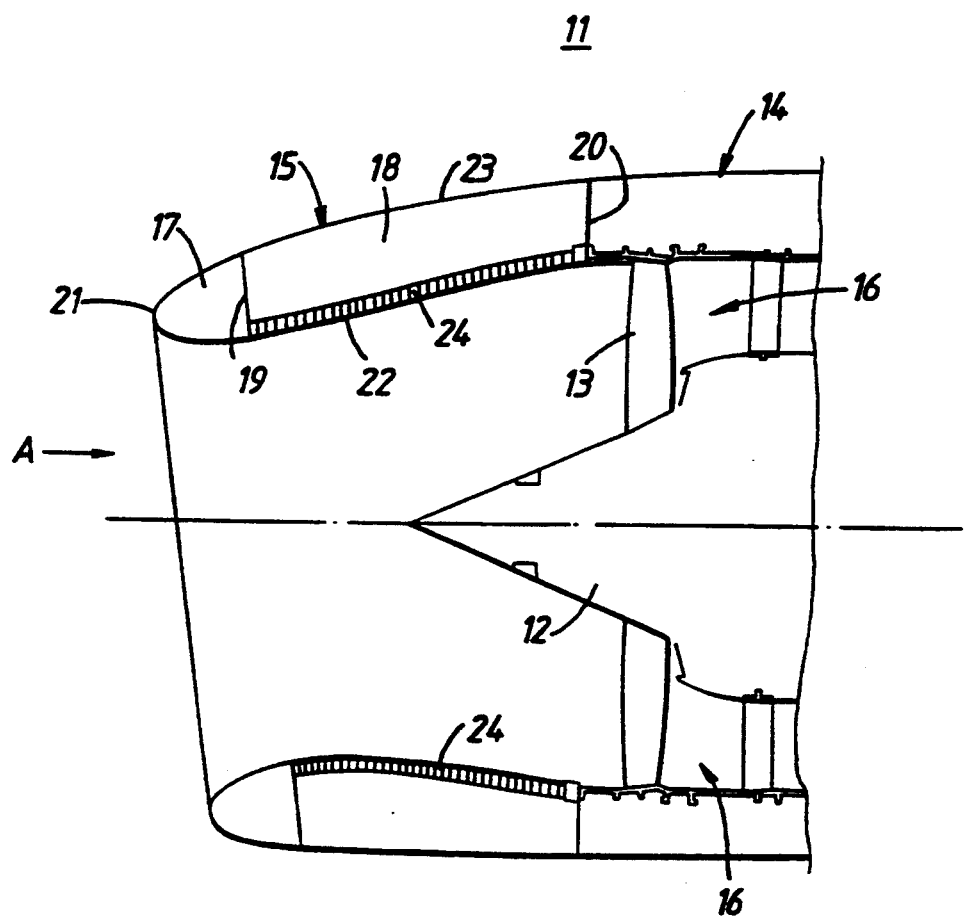
FIG. 1 is a schematic cross-sectional side elevation of a forward part of a turbo fan aero engine, showing in outline the nacelle nose cowl.

Referring first to FIG. 1, a forward part of an aero engine 11 is shown comprising a turbo power plant 12 carrying rotary fan blades 13 enclosed by an engine nacelle 14 having an inlet nose cowl 15 which directs intake air to a fan duct 16.

The nose cowl 15 is sub-divided into a leading edge forward compartment 17 and an rear compartment 18 by a forward bulkhead 19 and a rear bulkhead 20. The forward compartment 17 is bounded by the forward bulkhead 19 and a skin structure 21 which forms the leading edge profile of the nose cowl 15. The rear compartment 18 is bounded by the forward and rear bulkheads 19 and 20 and inner and outer skin structures 22 and 23. The inner skin structure 22 of the compartment 18 is required to have good sound absorbing properties and for this purpose noise attenuation panels 24 are provided which extend for the full circumference of the nose cowl.

Figure 2:
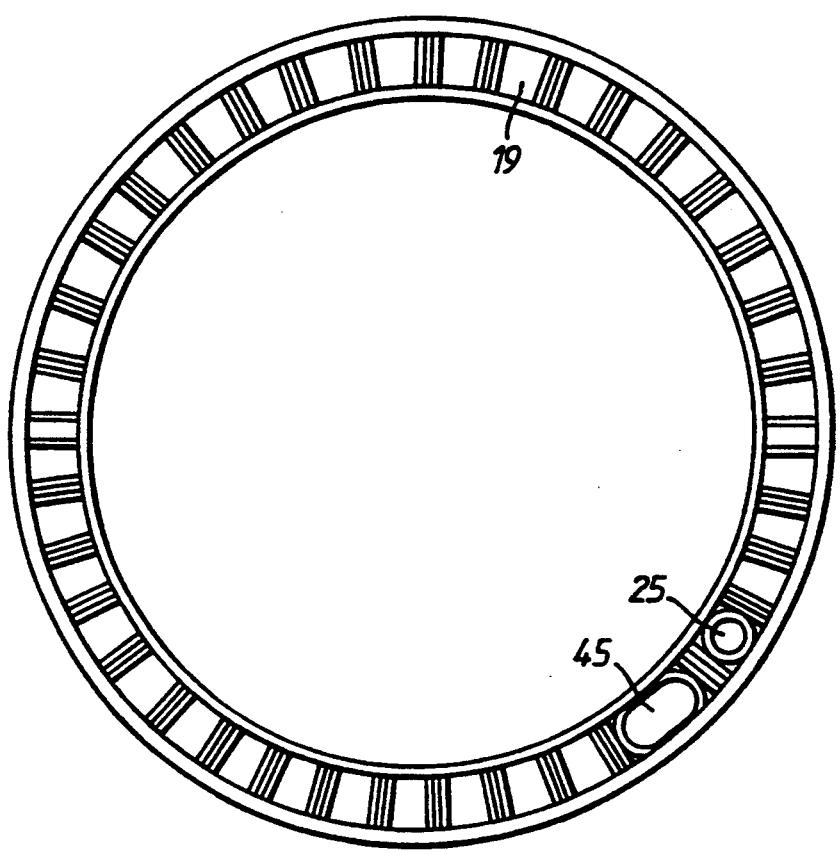
FIG. 2 is a schematic cross section of the nose cowl shown in FIG. 1 viewed in the direction A in FIG. 1 and illustrating the forward bulkhead
Figure 3:
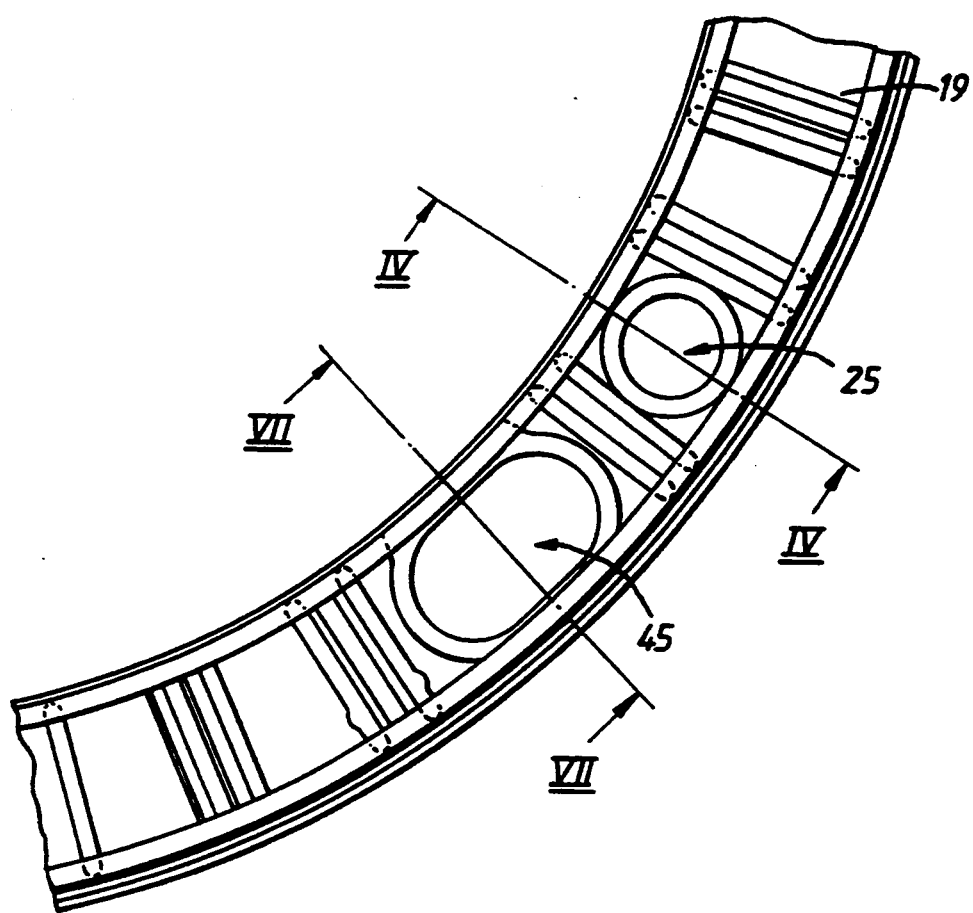
FIG. 3 is an enlarged view of a part only of the forward bulkhead shown in FIG. 2, illustrating the provision of a supply and discharge duct arrangement according to the invention.

Referring now to FIGS. 2 and 3, the forward bulkhead 19 is built up from arcuate sections to form with the skin structure 21 a gas tight forward compartment 17 which is supplied with pressurised hot gases through a supply duct 25 which are discharged from the compartment 17 through a discharge duct 45.

Figure 4:
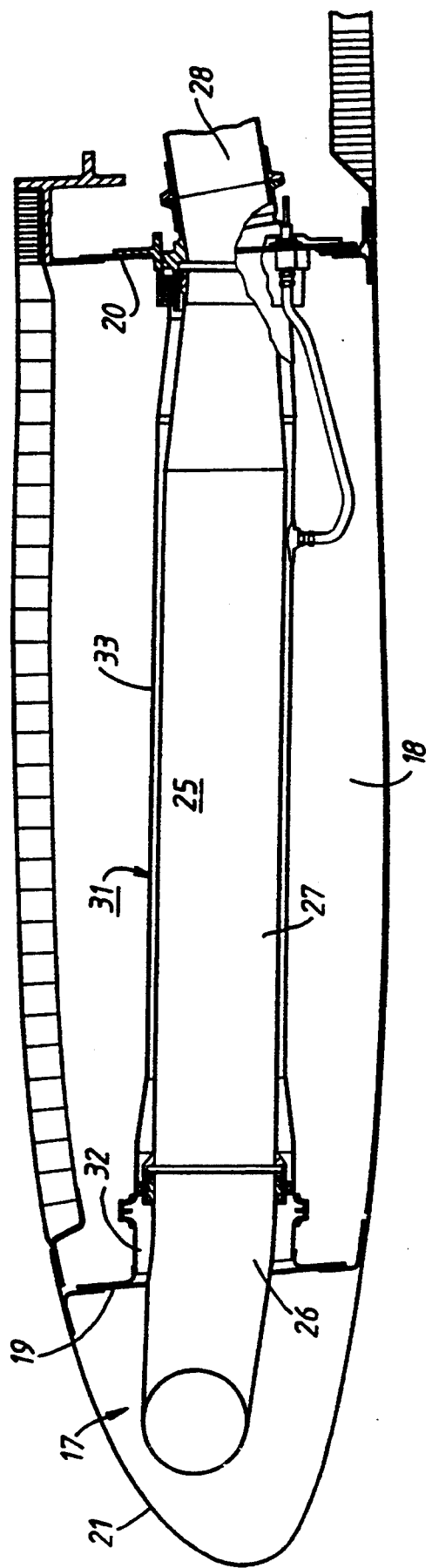
FIG. 4 is a schematic cross section of a lower part of the nose cowl shown in FIG. 1 taken on the radial line IV—IV in FIG. 3.

Turning now to the schematic section shown in FIG. 4, which is taken on the line IV—IV in FIG. 3, it will be seen that the supply duct 25 is formed by a forward supply duct portion 26 which passes through the bulkhead 19, a main supply duct portion 27 which extends throughout the length of the rear compartment 18 and a rear supply duct portion 28 which extends through the rear bulkhead 20.

Figure 5:
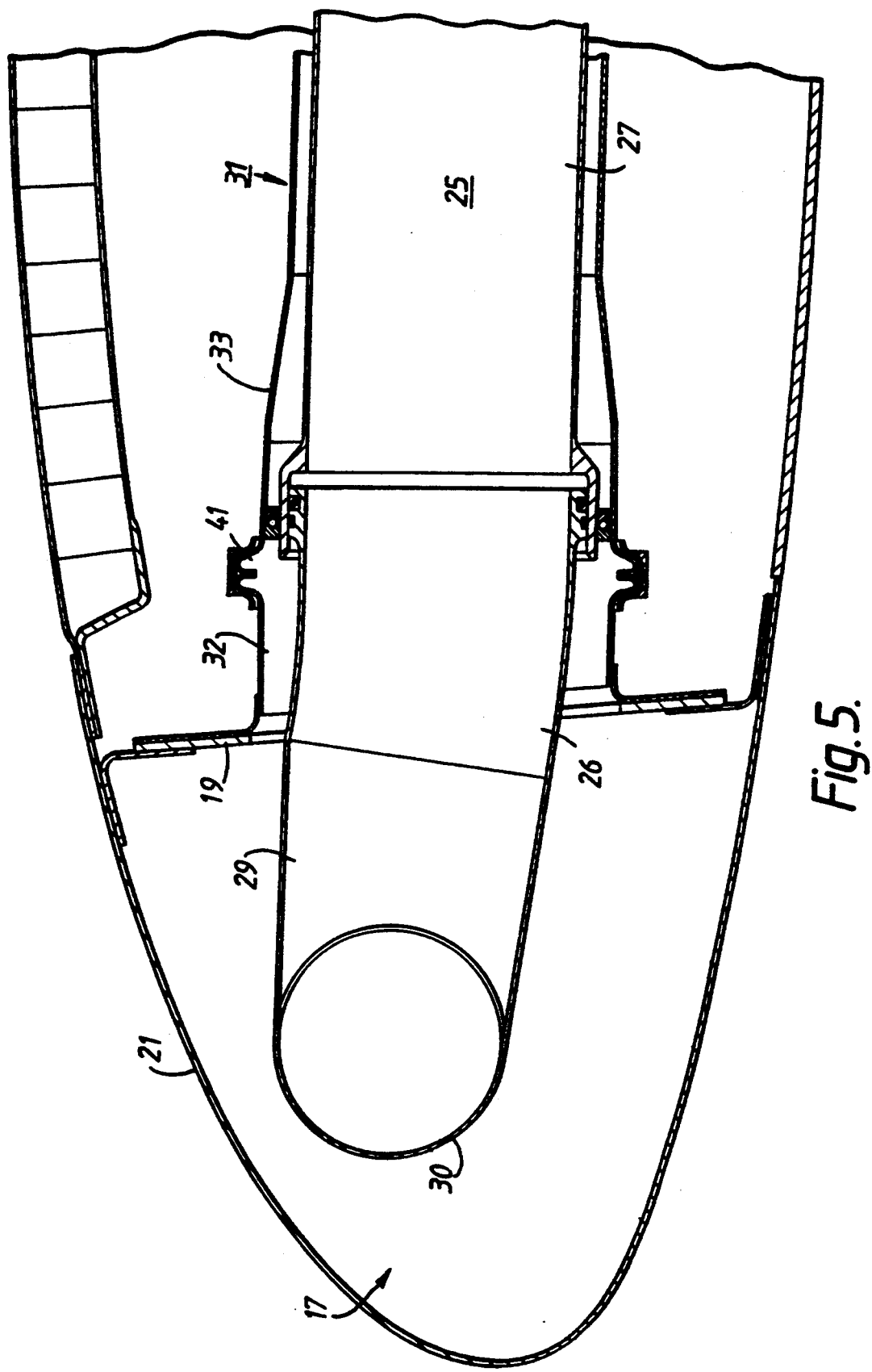
FIG. 5 is a schematic cross section of the nose cowl portion shown in FIG. 4, illustrating a forward region of the nose cowl and drawn to an enlarged scale.
Figure 6:
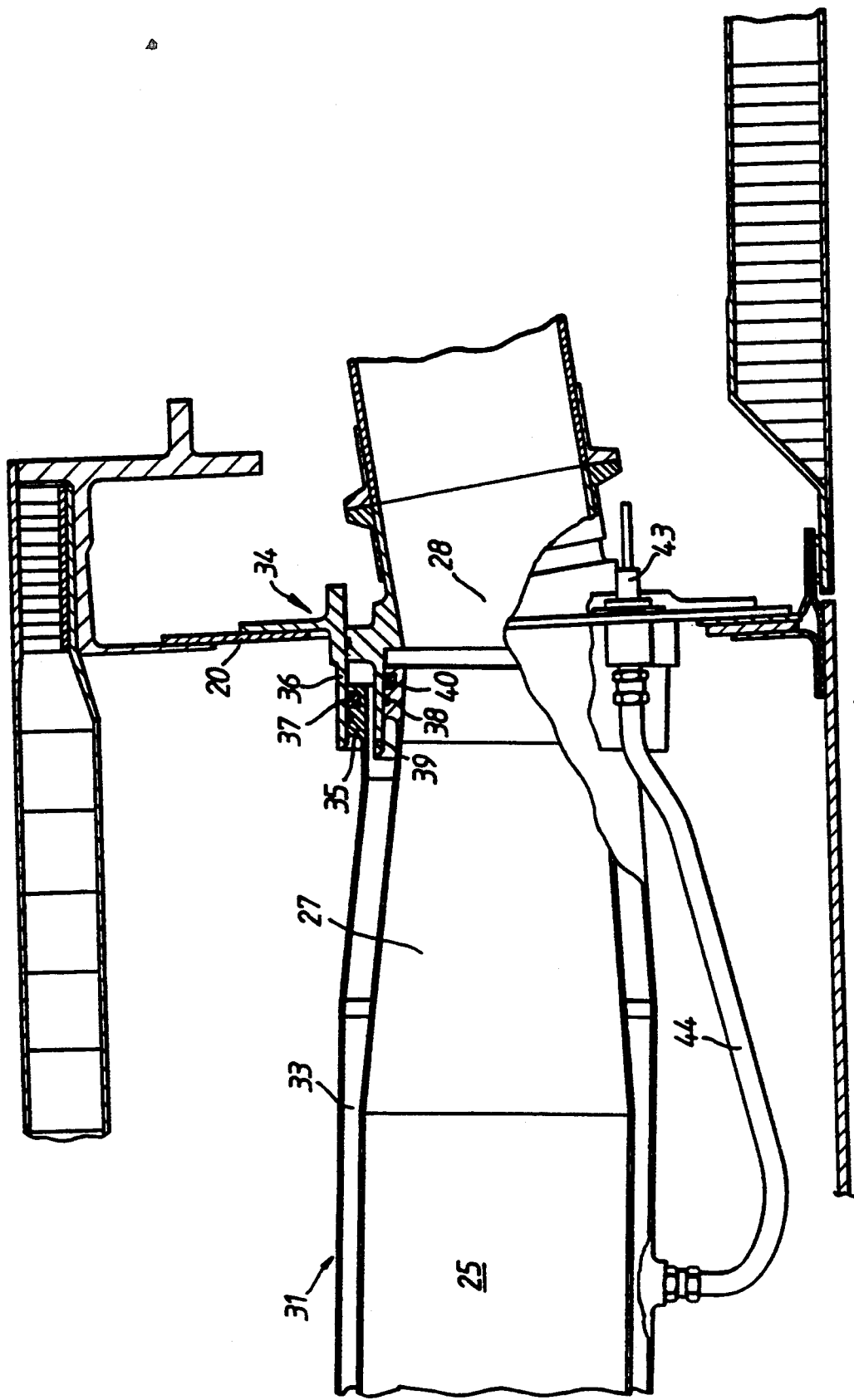
FIG. 6 is a schematic cross section corresponding to that shown in FIG. 4 illustrating an aft region of the nose cowl and drawn to an enlarged scale.

As more fully shown in FIG. 5, the forward portion 26 of the supply duct 25 extends forwardly into the forward compartment 17 and is connected to an inlet duct 29 of a tubular spray ring 30 which is apertured and which extends circumferentially within the compartment 17. Spray rings of this form are known in the art and are so apertured as, when supplied with pressurised hot gases delivered to the ring distribute the hot gases over the inner surface of the skin structure 21 to prevent the accumulation of ice on or to remove ice from the outer surface of the skin structure 21. As best seen in FIG. 6, the rear end of the main supply duct portion 27 engages with the rear supply duct portion 28.

The connections between the three supply duct portions 26, 27 and 28 are made gas tight and the arrangement is such that the supply duct 25 is supplied with pressurised hot gases from the engine environment for delivery to the spray ring 30 for distribution thereby. The rear compartment 18 of the nose cowl would be detrimentally affected in the event of the leakage of hot gases from the supply duct 25 and provision needs to be made to prevent or substantially reduce the likelihood of leakage into the rear compartment from the supply duct.

To this end, and referring now to FIGS. 4, 5 and 6, the supply duct 25 is provided with a protective shroud duct 31 which is formed by a forward shroud portion 32 which is secured to and terminates at the forward bulkhead 19, a main shroud duct portion 33 which is connected to the forward portion 32 in gas type manner and a rear shroud duct portion 34 which is secured to the rear bulkhead 20 and which is engaged in a gas type manner with the main shroud portion 33.

As best seen in FIG. 6, the main shroud portion 33 is formed with a collar 35 which slidably engages within a forwardly extending sleeve 36 of the rear shroud duct portion 34 which thereby supports the main shroud portion 33. The two portions 33 and 34 are joined in gas type manner by piston type seals 37. In a similar manner, the main supply duct portion 27 carries a collar 38 which slidably engages within a forwardly extending sleeve 39 carried on the rear supply duct portion 28 which is secured to the bulkhead 20 within the fixed rear shroud portion 34. In like manner, piston type seals 40 make gas tight connections between the supply duct portions 27 and 28.

It will be appreciated that the supply duct 25 and the protective shroud duct 31 are subjected to temperatures which differ widely from those experienced by other parts of the nose cowl and the sliding engagement of them at their respective rear duct portions 28 and 34 provides for thermal expansion and contraction of the two ducts longitudinally within the rear cowl compartment 18.

As shown in FIG. 5, the forward shroud duct portion 32 is rigidly secured to the front bulkhead 19 and is connected in gas-tight manner to the front end of the main shroud portion 33 by a clamp 41. The forward supply duct portion 25 is supported circumferentially by the shroud duct 32 in a manner which allows unimpeded flow communication within the shroud duct 31. The forward end of the shroud duct portion 32 opens into the forward compartment 17 to provide gaseous flow communication between the forward compartment 17 and the annular space formed between the shroud duct 31 and the supply duct 25.

The protective shroud duct 31 serves to protect the main compartment 18 of the nose cowl from a leakage of pressurised hot gases following a rupture of the supply duct 25 and the arrangement therefore retains the advantage found in the arrangement described in the aforesaid patent EP 0205283. Furthermore, gaseous flow communication between the forward compartment 17 and the annular space between the ducts 25 and 31 has been maintained, thereby retaining also the advantage found in the prior arrangement of allowing an equalisation of pressures between the forward compartment 17 and the annular space. This is particularly important for aircraft structures which are subject to wide variations of temperature and pressure as a result of changes in altitude.

Figure 7:
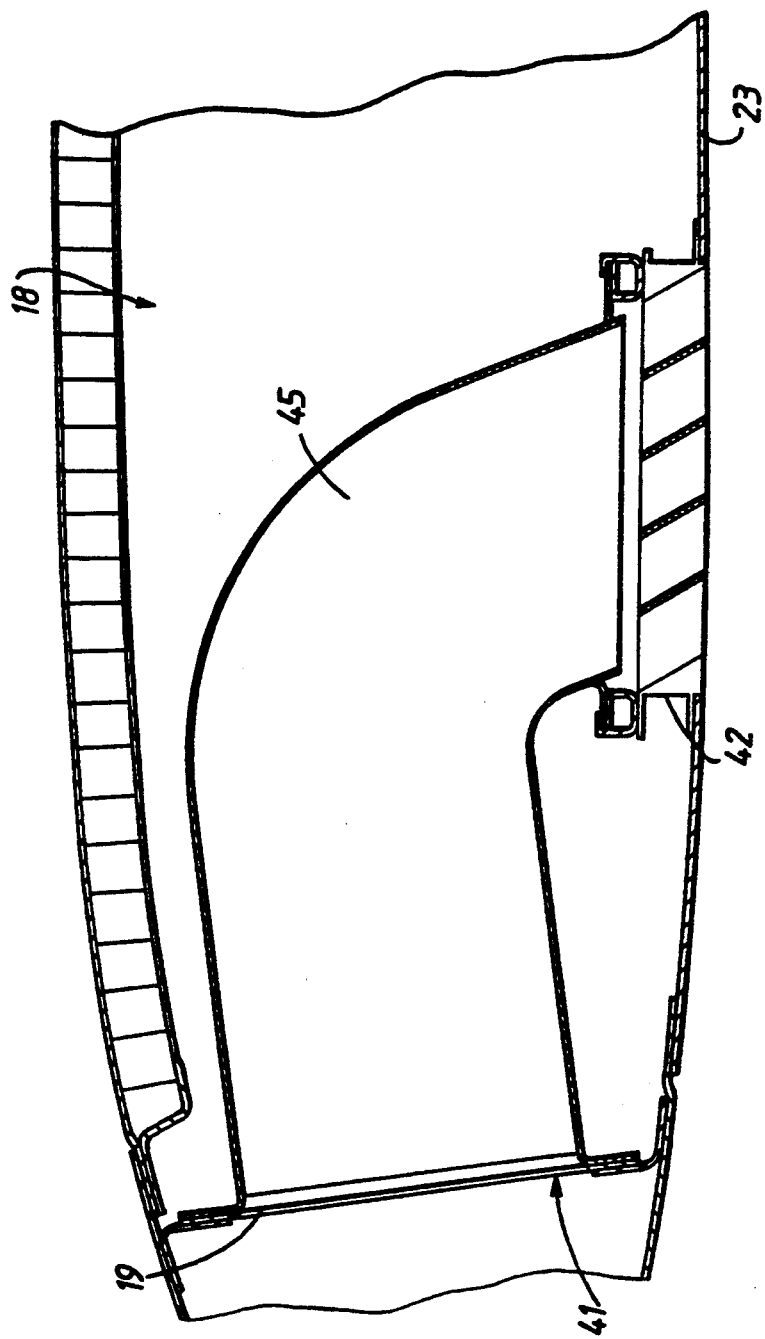
FIG. 7 is a schematic section taken on the line VII—VII in FIG. 3, drawn to an enlarged scale and illustrating a discharge duct forming part of the thermal anti-icing arrangement according to the invention.

Referring now to the schematic section of the nose cowl shown in FIG. 7, which is taken on the line VII—VII in FIG. 3, it will be seen that a discharge duct 45 is provided, which extends from an open end 41 in the forward bulkhead 19 to an outlet grill 42 provided in the outer skin structure 23 of the rear compartment 18. The discharge duct 45 is of substantial cross-sectional area as shown in FIG. 3 and is provided in the rear compartment adjacent the supply duct 25 and its protective shroud duct 31. With the availability of space within the rear compartment 18 the dimensions of the duct 45 can readily be so chosen as to provide for optimum discharge of spent gases from the forward compartment 17.

By providing a separate discharge duct 45 and protective shroud duct 31, the full advantages of the arrangement of the prior patent can be retained while at the same time allowing strict space limitations to be met by a reduction in the diameter of the shroud duct 31 as only a relatively narrow annular space between the shroud duct 31 and the supply duct 25 is required compared with that called for in the arrangement described in the prior patent where the annular space is also used for exhausting spent gases from the forward compartment 17 to atmosphere.

Furthermore, it is considered to be a disadvantage to exhaust spent gases through the annular space provided between the shroud duct and the supply duct as proposed in the prior patent as any leakage of hot gases are immediately exhausted direct to atmosphere. In contrast, in the arrangement according to the present invention, a rupture of the supply duct 25 in the region of the shroud duct 31 results in the continued supply of the pressurised hot gases to the forward compartment 17 so that they are utilised for thermal anti-icing before being discharged to atmosphere through the discharge duct 45.

As shown in FIG. 6, an over pressure indicator 43 is connected by duct 44 to the annular space between the shroud duct 31 and the supply duct 25 and provides an indication of an increase in pressure as a result of a leakage following rupture of the supply duct 25.

We claim:

1. An aircraft structural component comprising a forward compartment formed by a forward bulkhead and a skin structure which extends forwardly of the forward bulkhead and which has an outer surface which requires to be protected from accumulation of ice thereon, a rear compartment between the forward bulkhead and a rear bulkhead, supply duct means extending through the rear compartment and into the forward compartment for the delivery thereto of pressurised hot gases for distribution over the inner surface of the skin structure to prevent accumulation of ice on or to remove ice from the outer surface of the skin structure, protective means which surrounds the supply duct means, extends from the rear bulkhead to the forward bulkhead and forms an annular space between the protective means and the supply duct means, the annular space being closed off at its rear end at the rear bulkhead and throughout its length within the rear compartment by the protective means and being open at its forward end to provide gaseous flow communication with the forward compartment, whereby leakage of hot gases from the supply duct means upon rupture are prevented by the protective means from entering into the rear compartment and pass into the forward compartment, and discharge duct means for discharging gases from the forward compartment.

2. A component according to claim 1 wherein the protective means comprise forward protective shroud portion secured to the forward bulkhead, rearward protective shroud portion secured to the rear bulkhead and main protective shroud portion which at one end sealingly engages with either the forward or rearward protective shroud portions and at the other end sealingly and slidably engages with the other protective shroud portion.

3. A component according to claim 2 wherein the protective main shroud portion at its front end sealingly engages with the forward protective shroud portions and at its rear end sealingly and slidably engages the rearward protective shroud portions.

4. A component according to claim 1, wherein the supply duct means comprises a forward supply duct portion extending forwardly into the forward compartment and rearwardly into the forward protective shroud portion by which it is supported, a rear supply duct portion mounted in the rear bulkhead and a main supply duct portion which at one end sealingly engages with either the forward supply duct portion or the rear supply duct portion and at the other end sealingly and slidably engages with the other supply duct portion.

5. A component according to claim 4 wherein the main supply duct portion sealingly engages at its forward end with the forward supply duct portion and at its rear end sealingly and slidably engages with the rear supply duct portion.

6. An aircraft engine nacelle nose cowl including a structural component according to claim 1 wherein the forward and rear compartments extend circumferentially to form the nose cowl with the skin structure of the forward compartment providing a leading edge profile for the nose cowl, wherein distributor means are provided in the forward compartment for distributing pressurised hot gases to the inner surface of the skin structure of the forward compartment and wherein the distributor means is connected to the supply duct means for delivery thereto of pressurised hot gases supplied by the supply duct means.

7. A nose cowl according to claim 6 wherein the distributor means comprises a concentrically arranged circumferentially extending apertured spray ring for the distribution of pressurised hot gases supplied thereto.

8. A nose cowl according to claim 6 wherein the rear compartment is formed with inner and outer circumferentially extending skin structures, wherein the discharge means comprises a discharge duct which extends within the rear compartment from an inlet opening in the forward bulkhead to an outlet opening in the skin structure of the rear compartment to discharge from the forward compartment spent gases to atmosphere through the outlet opening.

9. A nose cowl according to claim 8 wherein the outlet opening for the discharge duct is provided in the radially outermost skin structure of the rear compartment.

10. A nose cowl according to claim 8 wherein the discharge duct extends through the rear compartment in proximity to the supply duct means and the protective means.

11. A component according to claim 2 wherein the supply duct means comprises a forward supply duct portion extending forwardly into the forward compartment and rearwardly into the forward protective shroud portion by which it is supported, a rear supply duct portion mounted in the rear bulkhead and a main supply duct portion which at one end sealingly engages with either the forward supply duct portion or the rear supply duct portion and at the other end sealingly and slidably engages with the other supply duct portion.

12. A component according to claim 3 wherein the supply duct means comprises a forward supply duct portion extending forwardly into the forward compartment and rearwardly into the forward protective shroud portion by which it is supported, a rear supply duct portion mounted in the rear bulkhead and a main supply duct portion which at one end sealingly engages with either the forward supply duct portion or the rear supply duct portion and at the other end sealingly and slidably engages with the other supply duct portion.

13. An aircraft engine nacelle nose cowl including a structural component according to claim 2 wherein the forward and rear compartments extend circumferentially to form the nose cowl with the skin structure of the forward compartment providing a leading edge profile for the nose cowl, wherein distributor means are provided in the forward compartment for distributing pressurised hot gases to the inner surface of the skin structure of the forward compartment and wherein the distributor means is connected to the supply duct means for delivery thereto of pressurised hot gases supplied by the supply duct means.

14. An aircraft engine nacelle nose cowl including a structural component according to claim 3 wherein the forward and rear compartments extend circumferentially to form the nose cowl with the skin structure of the forward compartment providing a leading edge profile for the nose cowl, wherein distributor means are provided in the forward compartment for distributing pressurised hot gases to the inner surface of the skin structure of the forward compartment and wherein the distributor means is connected to the supply duct means for delivery thereto of pressurised hot gases supplied by the supply duct means.

15. An aircraft engine nacelle nose cowl including a structural component according to claim 4 wherein the forward and rear compartments extend circumferentially to form the nose cowl with the skin structure of the forward compartment providing a leading edge profile for the nose cowl, wherein distributor means are provided in the forward compartment for distributing pressurised hot gases to the inner surface of the skin structure of the forward compartment and wherein the distributor means is connected to the supply duct means for delivery thereto of pressurised hot gases supplied by the supply duct means.

16. An aircraft engine nacelle nose cowl including a structural component according to claim 5 wherein the forward and rear compartments extend circumferentially to form the nose cowl with the skin structure of the forward compartment providing a leading edge profile for the nose cowl, wherein distributor means are provided in the forward compartment for distributing pressurised hot gases to the inner surface of the skin structure of the forward compartment and wherein the distributor means is connected to the supply duct means for delivery thereto of pressurised hot gases supplied by the supply duct means.

17. A nose cowl according to claim 7 wherein the rear compartment is formed with inner and outer circumferentially extending skin structures, wherein the discharge means comprises a discharge duct which extends within the rear compartment from an inlet opening in the forward bulkhead to an outlet opening in the skin structure of the rear compartment to discharge from the forward compartment spent gases to atmosphere through the outlet opening.

18. A nose cowl according to claim 9 wherein the discharge duct extends through the rear compartment in proximity to the supply duct means and the protective means.

* * * * *